(12) United States Patent
Kovarik et al.

(10) Patent No.: US 11,124,981 B2
(45) Date of Patent: Sep. 21, 2021

(54) APPARATUS FOR REMOVING A LAYER OF SEDIMENT WHICH HAS SETTLED ON THE BOTTOM OF A LARGE WATER BODY

(71) Applicant: Pond Mower, LLC, Englewood, CO (US)

(72) Inventors: Joseph E. Kovarik, Englewood, CO (US); Jeff Franek, Highlands Ranch, CO (US)

( * ) Notice: Subject to any disclaimer, the term of this patent is extended or adjusted under 35 U.S.C. 154(b) by 0 days.

(21) Appl. No.: 16/542,364

(22) Filed: Aug. 16, 2019

(65) Prior Publication Data

US 2019/0368214 A1 Dec. 5, 2019

Related U.S. Application Data

(63) Continuation of application No. 15/665,779, filed on Aug. 1, 2017, now Pat. No. 10,385,581, which is a continuation of application No. 14/694,129, filed on Apr. 23, 2015, now Pat. No. 9,732,537, which is a continuation of application No. 13/404,170, filed on Feb. 24, 2012, now Pat. No. 9,016,290.

(60) Provisional application No. 61/446,282, filed on Feb. 24, 2011, provisional application No. 61/471,506, filed on Apr. 4, 2011.

(51) Int. Cl.
*E04H 4/16* (2006.01)
*C02F 1/00* (2006.01)
*C02F 103/00* (2006.01)

(52) U.S. Cl.
CPC ........... *E04H 4/1636* (2013.01); *C02F 1/001* (2013.01); *C02F 2103/007* (2013.01); *C02F 2201/008* (2013.01); *C02F 2301/08* (2013.01); *C02F 2303/24* (2013.01)

(58) Field of Classification Search
None
See application file for complete search history.

(56) References Cited

U.S. PATENT DOCUMENTS

| 6,469 | A | | 5/1849 | Lincoln | |
|---|---|---|---|---|---|
| 5,524,320 | A | * | 6/1996 | Zachhuber | A47L 11/305 15/320 |
| 5,553,972 | A | | 9/1996 | Bergeron | |
| 5,995,884 | A | * | 11/1999 | Allen | G05D 1/0225 701/24 |
| 7,181,871 | B2 | * | 2/2007 | Sower | A01C 3/04 37/317 |

(Continued)

*Primary Examiner* — Eric W Golightly
(74) *Attorney, Agent, or Firm* — Sheridan Ross P.C.

(57) ABSTRACT

An apparatus for removing sediment from a pond includes: a handle; a vacuum unit connected to the handle, said vacuum unit having a first opening adapted for receiving material sucked into said opening and a second opening for material sucked into said vacuum unit to exit at a point outside said pond, said vacuum unit being submersible, supported by at least one wheel, and having an aperture for receiving a mixture from a bottom of the pond; a hose associated with said second opening; and a storage container, said storage container having a body and a storage film cartridge adapted to be positioned in said body, said cartridge having storage film therein, said storage film being permeable to water and having a mesh, and a sealing mechanism having an actuator operably connected to said cartridge, wherein actuation of said actuator rotates said cartridge causing said storage film to seal.

12 Claims, 6 Drawing Sheets

(56) References Cited

U.S. PATENT DOCUMENTS

| | | |
|---|---|---|
| 7,805,793 B2 | 10/2010 | Paxton |
| 8,926,221 B2 | 1/2015 | Hwang |
| 9,016,290 B2 | 4/2015 | Kovarik et al. |
| 9,732,537 B2 | 8/2017 | Kovarik et al. |
| 1,038,558 A1 | 8/2019 | Kovarik et al. |
| 2005/0247613 A1 | 11/2005 | Bishop |

* cited by examiner

APPARATUS FOR REMOVING A LAYER OF SEDIMENT WHICH HAS SETTLED ON THE BOTTOM OF A LARGE WATER BODY

RELATED APPLICATION

This application is a continuation of U.S. patent application Ser. No. 15/665,779, filed Feb. 24, 2012 (now U.S. Pat. No. 10,385,581, issued Aug. 20, 2019), which is a continuation of U.S. patent application Ser. No. 14/694,129, filed Apr. 23, 2015 (now U.S. Pat. No. 9,732,537, issued Aug. 15, 2017), which is a continuation of U.S. patent application Ser. No. 13/404,170, filed on Feb. 24, 2012 (now U.S. Pat. No. 9,016,290, issued Apr. 28, 2015), and which claims priority from U.S. Provisional Patent Application No. 61/446,282 filed Feb. 24, 2011 and U.S. Provisional Patent Application No. 61/471,506 filed on Apr. 4, 2011. The entire disclosure of the prior applications is considered to be part of the disclosure of the accompanying application and is hereby incorporated by reference.

FIELD OF THE INVENTION

The present invention relates to an apparatus and method for cleaning sediment from a pond, and more particularly for removing sediment from the bottom of a pond using a powered vacuum device.

BACKGROUND OF THE INVENTION

Numerous devices for removing sediment from ponds, lakes, streams, lagoons, and the like are known in the prior art. These vary from large trucks fitted with huge pumps and vacuums, to garden hose devices purportedly capable of creating suction sufficient to remove silt and debris from the bottom of a pond. Neither of these extremes is sufficient for a residential pond owner or for a pond servicing service where routine and periodic servicing of ponds of 8 feet wide to about 1 acre is involved.

Pond vacuums are popular with many water gardeners because of their convenience and ease of use. Such pond vacuums are primarily designed so that their motors remain out of the water but are positioned near the water's edge and used for cleaning algae blooms, fish waste, dead leaves, and other dirt that may collect at the bottom of the pond. Problems also exist in the use of such devices, including difficulties with respect to access to deeper portions of ponds, vacuum suction loss due to long tubes or pipes from the motor to the debris at the bottom of the pond, efficiencies of pumping action and ability to distribute and/or filter debris after removal from the pond; return of dirty water back to a pond, etc. Even other designs that employ submergible vacuums suffer from various deficiencies, including the absence of any support for a suction device above the bottom of a pond, especially the lack of any supports that have adjustable elevations, are able to maneuver around underwater obstacles (such as submerged potted plants) etc.

Existing gravity-fed bottom drainage systems have a number of disadvantages that make them unsuitable for the average domestic pond keeper. For example, they are extremely expensive, difficult to install into existing ponds, require a large installation area, have inaccessible pipe joints in the pond base and walls, and it is difficult to draw solid waste upwards out of the pond once such solids accumulate and such accumulation decays and pollutes the water quality.

There is therefore a long felt but unsolved need for a relatively simple and effective device, system and method for cleaning the bottom of ponds, especially lined ponds.

SUMMARY OF THE INVENTION

The present invention is generally directed to a system, device and method for removing a layer of sediment formed on the bottom of a pond. Certain embodiments are referred to as the "Pond Mower" due to some visual similarities of the present invention, in certain designs, to a traditional lawnmower.

As used herein, sediment includes any settable material which settles onto the bottom of a pond and the like and includes sand, sludge, aquatic algae and the like which collect on the bottom of ponds, especially ponds having a liner placed over the bottom of the pond to provide containment. The present invention removes the sediment without injuring the liner. In one embodiment, the method comprises providing at least one sediment removing vacuum unit that in one embodiment preferably includes a frame supporting the same with at least one single wheel of at least 6 to 8 inches in diameter, more preferably about one foot in diameter, preferably positioned behind the bottom suction end of the unit by at least about 12 inches. Such elevation above a pond bottom is preferably adjustable by various means, including wheel adjustment systems standard on lawnmowers.

Employing one of the several embodiments described herein, the process of removing a layer of sediment from the bottom of a pond comprises positioning the apparatus on the bottom of a pond with a layer of sediment on the bottom of the pond such that the suction is sufficient to suck up pebbles and stones that weigh at least about that of a quarter, with a screen preferably mounted near the suction end to prevent passage of undesired sized debris from flowing through an in-line impeller. In other embodiments, however, instead of attempting to preclude larger debris from being suctioned up, one aspect of the present invention is directed to retaining such debris in a manner such that it is collected and contained for removal for disposal. Other embodiments both screen out certain larger sized particles while also suctioning up other material for either conveyance outside the pond or into a retainment bag for later disposal.

One device that can be used in the present method is a pump system that is typically used to power water fountain features and in pond skimming systems. Such pumps are available in various sizes and capacities and are generally powered by electricity provided by outlets having a GSI trigger fuse such that any dangerous conditions will cause electric power to cease, thus preventing electrocution in an aqueous environment. A suitable pump for the size of job or pond is selected and preferably mounted on a frame to assist in conveyance of the device across a pond floor. In one embodiment, a rigid segment of PVC or other similar plastic, metal or composite pipe, preferably at least 1 inch in diameter, more preferably at least 1.5 inches in diameter and even more preferably at least about 2 inches in diameter, is connected to each end of the pump. The segment associated with the suction end of the pump is preferably at least about 1 foot long, more preferably about 18-24 inches, and is adapted for connecting to a desired suction end-piece, shaped to address particular issues arising in a pond cleaning endeavor. For example, various types and shapes of suction-apertured units can be associated with the suction-end segment, such as those that are typically used with wet-and-dry-vac units. One of skill in the art will appreciate how the configuration and shape of such an end unit will be suitable for the type and power of a pump being employed, e.g. a flat funnel shaped unit that spreads the suction force over an extended area; other units have brushes associated therewith to loosen material coming into contact with the brush; other suction apertures being adjustable (e.g. via a gate) to facilitate changing desired vacuum rates. In one embodiment, the device provides the operator with a rotatable variance gauge to adjust the aperture or diameter of the suction end of the device, such as by providing a telescoping-type end piece that can decrease the diameter of the suction tip.

A pipe or tube segment (i.e. second segment) associated with the non-suction end of the pump is preferably at least about 18 inches long, more preferably at least about 24-36 inches long, rendering it easy for a user to grasp the segment with both hands positioned above the mounted pump. In certain embodiments, one or both segments comprise a telescoping, adjustable nesting extension tube is employed. In a preferred embodiment, the two segments and pump are provided along a single axis such that the device is at least about 4 feet from end to end, more preferably at least about 4.5-6.5 feet in length, thus providing a device that can be relatively easily manipulated and carried by a single person. Handles can be mounted along the extent of the device to further facilitate manipulation and control of the device when being carried or while in use. Such handles can, for example, be provided such that one handle is provided either on the suction-end segment or on the pump itself, with another handle being provided along the second segment.

In a preferred embodiment, the device can be either fixedly or reversibly connected to an assembly designed to facilitate the conveyance of the device across a pond bottom. In one embodiment, at least one, and in certain other embodiments, preferably two or more slats or runners are provided that are designed to ride either through or on top of the pond bottom surface without unduly stirring up sediment or damaging a pond liner. Other embodiments utilize at least one wheel to facilitate movement of the device across a pond bottom and to further assist in the transport of the device to and from a pond. Thus, in one embodiment, a dolly-like carriage is provided such that the suction device (and segments associated with the pump/vacuum device) can be positioned either in an upright position or tilted position, even when not in use. It can be angled in a desired fashion when submerged in the pond and pushed and pulled as desired to suction up debris on the pond bottom. The device can be reversibly associated with such a conveyance assembly to permit the operator to physically manipulate the device either with the benefit of either a ski or wheeled device, or alternatively, if weight concerns or underwater obstructions are of concern, without the possible cumbersome nature of a wheeled or ski-tracked associated unit.

The weight of the unit, at least the portion that is submerged, is preferably below about 60 lbs, more preferably below about 50 pounds, and most preferably less than about 45 lbs. It should be appreciated that because the device is used while being at least partially submerged in a pond, the weight of the device seems less when in use, thus providing easier handling by a single operator. The combination of the relatively sleek design (e.g. preferably an in-line suction end, pump/vacuum and non-suction end) plus the relatively light weight of the device, provides a distinct advantage over prior art systems that are typically much heavier (relative to the suction power required to perform similar debris removal), are not submerged during use, fail to provide a powered suction pump/vacuum within feet of the pond bottom, and/or have tubing and electrical cords that are not confined in an in-line fashion, thus allowing for the operator to become entangled, etc.

While certain situations and environments call for the vacuum unit to be submersible and in close proximity to the pond bottom surface, in other embodiments of the present invention, the powered vacuum unit may be positioned outside the pond (e.g. on its edge) or is in another position within the pond or in an adjacent water container. One embodiment provides an operator with the option of either standing on the edge of a pond and manipulating an elongated hand-held member connected to a submersible suction end, designed to come into close proximity to the pond bottom; or to enter the pond and suction debris from its bottom by positioning the suction end to desired locations. Certain prior art devices are not designed to permit an operator to enter the pond to perform suctioning activities as the electrical cord connection and associated poles used to manipulate the vacuum unit are awkward and potentially dangerous if an operator attempted to enter the pond with the same. For example, in a preferred embodiment of the present invention, the electrical cord is closely associated with at least the first or second segment such that the cord cannot be tripped over the operator, especially when pond water is disturbed, obscuring visibility of the same. In some preferred embodiments, the electrical cord used with the present invention is itself made to be buoyant so that the operator, once in the pond, does not become entangled in the cord by not seeing the submerged extent of cord while the suctioning operation is ongoing. Similarly, the long extended poles of certain prior art devices are ill-suited for in-pond use of a suctioning unit that has (in addition to a non-constrained length of electrical cord) an extended length of hose or tubing extending from the vacuum unit to a place outside the pond.

Despite the benefits of certain embodiments of the present invention that are designed for an operator to be in a pond with the device, there are certain advantages attained by having a suctioning unit positioned on the edge of a pond, rather than submerged and associated with the operator's hand-held suction tool, including the weight reduction accompanying having a powerful and heavy suctioning unit not associated directly with a submerged suction end of a tool. Thus, in one embodiment of the present invention, an extended hose of at least about 2 inches in diameter is provided, being at least about 15-20 feet or more in length, having a suction head designed to be in proximity to a pond bottom, and having an operator held portion that is above the suction head portion and prior to the extended hose portion. In one embodiment, there are handles associated with the operator held portion of the device, but in others, the operator merely holds a rigid tube having a diameter of at least about 2 inches, which is in alignment with the suction head portion and the extended hose connection.

In one embodiment, the above described operator held unit, sans any submersible vacuum unit connected to the suction head portion, is further provided with a pond contacting device to facilitate the operator's ability to manipulate the suction head portion in a desired fashion. For example, a single wheel, single ski, etc. can be associated with the operator held unit to provide support for the unit and to facilitate ease of quickly turning the unit (e.g. devoid of two or more wheels which restricts such facile movements).

In one embodiment, there is a shut-off control provided directly on the pump/vacuum or one of the associated segments, thus providing the operator of the device with the ability to cut either suction from being employed or to cease electric power being provided to the unit. Other embodiments also provide at least two different power levels for the device, thus providing the operator with the ability, while in the pond, to adjust the power/suction degree to address certain environments or situations. For example, in situations where a particularly thick and dense area of pond bottom sediment is encountered, the operator can adjust the power level to increase suction. A dial or lever-type device or gauge can be employed to achieve such control by the operator, such dial provided near a handle of the suctioning end.

In one embodiment, the apparatus comprises a vacuum device, such as a torpedo pump, positioned on a preferably wheel mounted assembly such that a user can push the device across the pond floor while wading in the pond (e.g. the user may be in a chest wader if the water is cold and the water level is up to about chest high.) While one wheel may be sufficient to provide movable support for the under-water carriage, two, three, four or more wheels, suitable to support various larger or heavier versions of units. In one embodiment, a vacuum device can be obtained from Cal Pump, preferably its Direct Drive Torpedo Pump with a capable throughput of about 4000 gph. As otherwise described below, the use of two or more pumps, one preferably submerged with the other outside the water and near the pond, is contemplated in situations where additional suction power is desired.

In one embodiment, Cal Pump Direct Drive Torpedo Pumps energy efficient pumps may be employed, as they are water-cooled, use no oil, and may be used as submersible, in-line pumps. The size, power, capacity, dimensions, etc. of a vacuum device can vary dependent upon the job at hand, but preferably the vacuum is sufficient to draw in substantial amounts of silt and debris from the bottom of the pond without damaging the underlying pond surface or liner.

In particular, pumps similar to those available from Osae can be employed (see issued patents referenced below), especially for the vacuum unit positioned outside the pond, thus facilitating the desired vacuum power to address the significant weight of water being suctioned out of the pond. A number of other patents and published applications directed to technologies owned by Oase are also incorporated herein by reference to provide particular written disclosure of systems and methods applicable to various embodiments of the present invention, including the following: U. S. Pat. Nos. and publication nos.: U.S. Pat. No. 7,686,951; 0070065316; 7686951; 0070183905; 0070199595; 0070286752; 0080054088; 0080044293; 0080056911; 0080105311; 0080217229; 00900040. Still other patents incorporated by reference herein include: U.S. Pat. No. 5,131,821 to Marioni; U.S. Pat. No. 5,314,619 to Runyon; U.S. Pat. No. 5,095,571 to Sargent; U.S. Pat. No. 7,270,746 to Wang; U.S. Pat. No. 7,708,149 to Pank et al; U.S. Pat. No. 7,465,129 to Singleton; and U.S. Pat. No. 5,553,972.

In certain embodiments, the selection of a pump or pumps to employ in a device or method of the present invention is achieved by reference to a pump curve. A pump curve is a simple graph which shows the performance characteristics of a particular pump. There is an inverse relationship between pressure and flow. Higher pressures mean lower flows, Lower pressures result in higher flows. Centrifugal type pumps are often used for irrigation and are preferred in many embodiments disclosed herein. Two variables affect the pump performance: horsepower of the motor attached to the pump, with bigger motors having more volume and pressure; and the size of the impeller. The pressure that the pump is capable of producing is typically measured in feet of head, rather than PSI. A pump is selected based on a size that will produce both the head and GPM desired, and thus involves selection of the horsepower and impeller size that will provide desired performance. Together the impeller curves and horsepower lines on a pump curve represent the best performance the pump is capable of if that horsepower or impeller size is selected.

In one embodiment, an aspirator similar to that described in U.S. Pat. No. 7,814,926, incorporated herein by this reference, is employed to address particular issues when pond water is especially filled with sludge. Thus, in one embodiment, a liquid aspirator for liquids containing solids comprises a housing comprising a receptacle and a lid; at least one aspirator motor arranged in the housing; the receptacle enclosing at least two receiving chambers for liquid, each of the at least two receiving chambers having an air aspiration opening that is connected to a vacuum side of the at least one aspirator motor and is provided with a main valve; and a vacuum connector connected to the receptacle. Liquid is sucked into the receptacle through the vacuum connector with the at least one aspirator motor, wherein a section of the vacuum connector arranged inside the receptacle has for each one of the at least two receiving chambers a separate closeable opening so that the vacuum connector communicates separately with each one of the at least two receiving chambers, and a drainage is connected to the receptacle through which drainage liquid contained in the receptacle drains from the receptacle. A control acts on the main valves so as to alternatingly open and close the air aspiration openings so that the at least two receiving chambers are alternatingly filled with liquid through the closeable openings of the vacuum connector, respectively, and so that one of the at least two receiving chambers currently not being filled is drained.

In other embodiments, different types of vacuum units can be connected in series to address suction issues. For example, connection of one of the above referenced Osae pumps to a wet-dry vacuum (e.g. available from Black and Decker, Ace Hardware, etc.) facilitates having vacuum suction available on a more consistent basis was the water filling units of the Osae units fill and drain. Preferably, the Osae vacuum is the unit that is connected to hose that enters the pond and a dry vac unit is positioned nearby the Osae unit and has tubing that facilitates the exiting stream of water to either a filtration unit, surrounding ground or back into the pond.

With respect to suitable pumps for use with various embodiments, the following describes configurations and designs of pumps. For example, a pump of the type as is shown in U.S. Pat. No. 5,713,719 can be used, or any suitable pump that may include a rotary or centrifugal pump with an open impeller. The impeller may include pump wheel vanes, with a flow channel formed between the pump wheel vanes, one of the pump wheel vane carrying discs and a housing section. These flow channels expand in their cross section going from the radial inward side towards the outer side. Another variation is disclosed in WO 94/03731, incorporated herein by reference, which discloses a centrifugal pump with a non-dog impeller, in which the flow channels are defined between full pump vanes and extend from the rotation axis of the impeller to the radial periphery. Still others include those disclosed in US 2004/0126228, also incorporated herein by this reference, where an impeller pump with a special geometry of the spiral housing is shown. Centrifugal pumps are known from the general state of the art, which have a rotating impeller for conveying water. The pumps are usually employed by full emersion in the water to be conveyed (submersion pumps). The suction side can also be placed in communication with the water to be conveyed via a pump. Centrifugal pumps operate according to a hydrodynamic conveyance principal, where the water to be conveyed is supplied in the vicinity of the rotation axis of the impeller, is taken along with the rotating impeller with its thereupon located vanes and is forced to a circular or orbital track. By the centrifugal force acting upon the water rotating in the circular track the water is radially forced outward. Accordingly, a vacuum is produced close to the rotation axis at the water intake (suction side) and an over pressure is produced at the periphery of the impeller (pressure side). Centrifugal pumps are very reliable and with appropriate design of impeller and associated pump housing, water with solids can be conveyed. In a preferred embodiment, a self-priming centrifugal pump is used, examples of such pumps being disclosed in U.S. Pat. Nos. 6,409,478 and 6,783,330 issued to Carnes et al., which are incorporated herein by this reference.

In preferred embodiments, the impeller is designed as a so-called non-dog impeller. Non-dog impellers, however, have a somewhat poorer degree of effectiveness due to circulation short-circuits and internal pressure equalization in comparison to pumps with a closed impeller. Pumps with a closed impeller are, however, more susceptible to clogging, so that a correspondingly finer filter must be provided on the suction side, which provides a corresponding resistance on circulation. One of skill in the art will understand that one objective for a given project is to optimize a centrifugal pump with an open impeller to achieve an improved degree of effectiveness. Flow channels formed between the vanes are selected that have a cross-section that diminishes in the direction of flow from the radial inner side towards the outer side. The cross-sectional narrowing of the flow channels in radial direction from the rotation axis towards the outside brings about an increase in the centrifugal flow and herewith the hydrodynamic conveyance pressure. Preferably, the degree of narrowing at the flow channel is 15% to 40%, and more preferably 20% to 35%.

The degree of effectiveness of a pump may be increased when the height of the vanes of the impeller measured axially to the rotation axis decreases from the radial inner side towards the outer side, so that the open side of the impeller is spaced apart from a counterflow plate with an essentially even gap. To avoid clogging in the flow channels of the impeller by solid particles, the height of the vanes at the radial outer side is larger than or equal to the width of the flow channels. Further improvements may be achieved if the flow channels formed between the vanes have the same width from the radial inner side towards the outer side of the impeller. To avoid clogging, the width of the flow channels should be larger than or equal to the maximum permissible particle size. Also preferred are vanes having a sickle shaped cross section in the plane radial to the rotation axis to create a hydro-dynamically flow channel geometry.

Still other embodiments of the invention include the use of more than one suctioning device. For example, in one embodiment a vacuum device is submergible and associated with a suction end in close proximity to the pond bottom (e.g. within 2 feet), and another vacuum unit is positioned either outside the pond or in a separate location from the first suction device (e.g. also in the pond). Thus, two separate vacuum units, connected in series, provide extra power in suctioning operations and facilitate the operator's ability to separately adjust suction rates, etc. for particular purposes. For example, the vacuum unit submerged in a pond may be used primarily to suction leaves and larger debris and the bagging thereof, while the second remote pump/vacuum would serve the primary goal of sucking silt laden water out of the pond for disposal or further treatment/filtering.

In one embodiment, a bag-type device is provided at the suction end of the device and is maintained in position so as to catch debris that would otherwise interfere with the vanes or impeller or other functioning features of a vacuum device. Thus, leaves, sticks, pine needles, rocks, etc. can be preferably entrapped in a mesh-like bag that permits smaller silt to pass through so that the silt and associated water is pulled through the vacuum device to exit through a tube and/or hose, thus exiting the pond either onto soil, lawns, trees,—or alternatively into some type of filtering system (i.e. to separate water from the silt and debris prior to return to the pond.)

In one embodiment where a bagging end is provided, the mesh bag is fitted such that it is sucked into the end-suction device, which preferably is shaped in a bowl or cone-like configuration to concentrate the suction power but to permit larger leaves, etc. to be sucked into the mesh and held there via the suction of the device. Silt vacuumed from the pond bottom passes through the mesh and travels through the vacuum vanes/impeller and out the exit tube/hose. When the mesh bag is sufficiently full of leaves and other larger debris, it can be removed and replaced. One way to accomplish this is to provide a drawstring-like closure member on the external end of the water porous bag that can be cinched when the mesh bag is full or when the suction is adversely affected by the mesh being blocked by debris. After cinching of the bag, the leaves and debris are trapped and enclosed in the bag and can be dispended with by removing them from the pond environment. In a variant embodiment, a diaper genie-type bagging system can be employed where successive mesh segments are generated via either a drawstring or cinching mechanism, or alternatively a twisting of the end of the mesh, thus enclosing larger debris so that it can be dispensed with, see e.g., U.S. Pat. No. 5,813,200 incorporated herein by this reference.

In one embodiment, a separate, out-of-the-pond filter device is used to separate certain aspects of debris suctioned form the pond. In one embodiment, leaves, sticks, stones, rocks, etc. far larger in size and denser than fine silt that is also suctioned, can be removed for separate disposal. A portable and reversibly collapsible unit, (e.g. similar to the Blagdon Monsta system's filter device) can be employed for such purpose. However, in a preferred embodiment of the present invention, a far more robust and effective filtering system is employed. In one embodiment, a two-part container system is used so that debris laden water is suctioned to a first container, the container being fitted with a permeable bag, preferably one having suitably sized apertures such that larger debris is retained in the bag but that smaller debris and silt containing water can readily pass there through, and can be directed out of the first container into a second container. The second container is fitted with appropriate filters such that a next smaller size of debris can be removed from the water. This process of directing suctioned water through two or more containers with successive filtering treatments to remove ever smaller debris, can be employed until a desired quality of water sans sediment, etc. is achieved. Preferably, however, and unlike certain prior art systems, the silt-laden water is not returned directly to the pond after a single filtering step, e.g. where leaves and larger debris is removed. Instead, one aspect of certain embodiments is to provide at least two filtering steps with the objective being to remove a substantial quantity of silt from suctioned water prior to returning the water to the pond.

In still other embodiments, where it is acceptable to irrigate surrounding land, return of the suctioned water is not accomplished and in fact, the silt laden water is believed to be especially beneficial to surrounding grass, trees, etc as a fertilizer. Replacement of cleaner water to the pond can be achieved via other means. In such a manner, a pond owner is ensured that the majority of solid debris is removed from the pond and that dirty water is not immediately returned to the pond after only some larger debris is removed therefrom. This is considered a significant disadvantage of prior art systems.

Another aspect of the present invention relates to the ability to not only effectively suck up silt from pond bottoms, but to also minimize the blocking of a suction device due to larger debris blocking the suction end. Various mesh-like covers on the suction end can be used, such as chicken wire, other metal matrices, fabric having desired porosity and filtering characteristics, etc. in a manner that the straining function of such features can periodically be cleaned.

One embodiment of the invention, called a "pond mower" due to its general visual similarity to a reel lawnmower, is pictured in the figures. While a one wheel support assembly is desirable and advantageous due to increased maneuverability, more than two wheels can be used, and it is believed that the stability and maneuverability of the device with two wheels is sufficient for most environments and uses. Other embodiments employ more than two wheels, slats, skis or other bottom surface supporting elements that ride upon the pond bottom surface, etc., which can also be used in combination (e.g. wheeled and ski combos), in order to provide desired stability and to support other associated structures of the device. In particular, in some embodiments, the wheels directly support a silt constraining enclosure or housing. In others, the wheels support the heavier pump/vacuum unit that is submerged in the pond. In still other embodiments, wheels are used to separately support the silt curtain/housing and other portions of the submerged unit, such as the vacuum unit, tubing, etc. thus, a plurality of wheels can be associated with the submerged portions of the unit to facilitate conveyance and avoidance of submerged obstacles, such as rocks, potted pond plants, etc.

For example, in one embodiment, it is desirable to provide an enclosure such that a certain predetermined area above (e.g., at least about ½ inch; more preferably about 1 inch and most preferably less than about 2 inches from the silt layer top to the descending silt curtain) but proximate to the silt layer sought to be removed is precluded from being disturbed in a manner that would otherwise cause silt to freely cloud the surrounding water. By using an enclosure (at least one) it is possible to constrain the degree of silt clouding and thus to suck a more concentrated silt and water content from the pond. Preferably, the enclosure can be of a desired shape and size so that silt debris can be substantially contained within a region of the suction end of the device, for example, by providing side walls to an over-hanging ceiling member that traps disturbed silt within such enclosure for vacuuming into the device. In such embodiments, the suction end of the vacuum device is positioned such that it can exert suction within or under the enclosure. While a standard fitting or broad nozzle from, for example, a dry-vac device, can be employed at the suction end of the present invention, other more expansive covering enclosures can be employed. For example, a geometrically designed enclosure that is situated so that it extends from the suction end in a forward direction (e.g. the direction of travel) for at least about 6 inches, preferably at least about 12 inches and in some embodiments about two feet or more, such the an extended calm area is created above such enclosure and conversely, below such enclosure, silt is concentrated and confined to a significant degree within such enclosure, thus permitting the suction action to effectively remove concentrated silt containing water. The enclosure can be adapted to be reversibly attachable to the unit and in preferred embodiments is at least partially transparent so as to provide an operator desired visibility of the pond bottom. Preferably, the extending portion of the cover is transparent to a degree and extent such that an operator's view of the bottom of the pond through the pond water is not entirely obscured by the extension itself.

In one embodiment, an inflatable extended segment (again, preferably having at least one transparent feature to provide viewing of the pond bottom) is provided that provides a zone of quiet so that disturbed sediment is precluded from freely floating upwards or in undesired directions. In one embodiment, a shaped air-bladder is inflated to create a desired shelf under the water surface, preferably in close proximity to the suction end of the device, providing a quiet zone so that the operator can effectively suction fine debris below such shelf. In one embodiment, this may resemble a miniature version of a child's inflatable pool where a circumferential tube is inflated and suspends a connected extent of plastic or fabric there between. For some embodiments, such air bladders can also assist in generating desired buoyancy of the entire device, thus facilitating movement of the unit when in operation by lessening the weight and providing the ability to selectively adjust the distance of the suction end from the bottom of the pond. Thus, in one embodiment, adjustability of the distance from the bottom of the pond and the suction end can be achieved by provision of submarine-type leveling systems such that, for example, a higher powered (heavier) vacuum could be employed but the unit, instead of being within inches of the pond bottom, may instead by adjusted to "float" above rocks plant tubs, etc. already on the pond surface. In such a manner, an operator can far more efficiently and quickly clean debris from a pond that has planted pots (i.e. water lilies, cattails, etc.) without the need to remove such pots from the pond prior to cleaning of the pond's bottom surface.

In a preferred embodiment, the vacuum device is electrically powered (e.g. like the Cal Pump unit described herein). The cord length can vary but should preferably be of a size that permits a pond servicer or owner to traverse the entire pond bottom with the minimum number of detachments and reattachments to different electrical outlets. Extension cords can be employed to provide desired length of cord, however, care must be taken with respect to interconnection of such cords as they may be immersed in water of the pond. Thus, preferably the cord associated with the device is of a continuous length that permits the entire pond bottom to be cleaned without the use of extension cords. In one embodiment, the cord is at least 40 feet in length. Electrical generators can be used to provide power in situations where outlets for electricity do not already exist. In a preferred embodiment, the electrical cord is closely associated with the non-suction segment of the device such that it is not encumbering the movement of the operator when the device is used. For example, the cord is mounted either along-side or in the interior of the exit tube so that the operator is to not prone to trip or tangle in the cord. Clips or a conduit associated with the exiting tube or hose of the invention such that it directs the cord in a fashion so that it is not free to tangle with an operator's feet, etc. is preferred. In other embodiments, at least sections of the electrical cord are buoyant or have buoyant devices associated therewith to permit the operator to know where the cord is during use, thus reducing the occasions where the cord could tangle the operator's feet or body if submerged in the water. Thus, in one embodiment, the cord is provided with floating segments or is coated with a buoyant material along its entire extent, but at least preferably provided on the cord just after it exists the upper-non-suction segment (e.g. as the cord exists the unit and extends toward the power outlet outside the pond.)

Other power sources can be employed, such as gas powered engines, etc. but electricity is the preferred mode of power, if only due to the quietness of the same, the ease of using electrically powered pump/vacuum systems tested and approved for use while submerged, etc.

In certain embodiments, either a water or air stream can be further provided to assist in the dislodging of sediment, for dispersing of sediment so as to improve visualization of underwater conditions, etc. Thus, in on embodiment, a valve can be used that directs a stream from the exiting waterstream (containing sediment therein) toward an area of interest of the operator. For example, if an operator wants to cleanse a submerged rock from debris residing thereon, a valve is opened to permit a directed stream of water to blow such sediment from the rock surface (e.g. like a spray-gun used for washing a car) and then the valve can be shut and the operator can suction up the sediment. An air bubbling stream can also be provided associated with the suction device to similarly utilize air instead of or in conjunction with water to remove and/or direct sediment in the water.

Although in one preferred embodiment, no powered movement mechanism is involved, other embodiments (e.g. especially those where more bulky or heavy units are involved) employ such powered conveyance to permit an operator from having to push or pull a vacuum device across the pond bottom surface. Such a self-propelling feature can be of any suitable design and type, however, preferably the power would be electric (as the vacuum would similarly be powered) and systems similar to those employed on lawnmowers and/or rug or pool vacuums for similar purposes can be used, suitably adjusted to operate in submerged conditions.

In other embodiments, the system can be remote controlled in various respects, including directing the traveling of the unit across a pond floor, directing the herein described bagging operations (e.g. using the diaper genie-type mechanism); adjusting the height of the unit above a surface of the pond floor to address plantings, rocks, other obstacles, adjusting a silt curtain, etc. This feature is particularly beneficial in deep water where an operator may be up over their neck in water if attempting to physically and manually push and pull the device. While numerous ponds of a depth that an operator is able to manually enter the pond to perform the present method albeit sometime perhaps necessitating a snorkel, other deeper water environments may require scuba gear or the use of the herein described remote control system. Remote control systems are well known an implementation in its various forms will be straightforward to those of skill in the art. Incorporated by reference herein for suitable types of remote control systems are the following: 20050040283 to Frazer; 20080119106 to Imai; U.S. Pat. No. 6,165,036 to Hino, et al.; 20100054961 to Palecek; U.S. Pat. No. 7,500,441 to Van-Zwol; and U.S. Pat. No. 7,290,496 to Asfar, et al.

One aspect of certain embodiments of the present invention relates to the conveyance of sediment containing water out of the pond and to an outer pond location. In one embodiment, the sediment laden water is conveyed through flexible hose to a relatively close location outside of a pond, such as neighboring lawns or trees where such nutrient rich water is a desirable fertilizer for the growth of grass, trees, etc. Alternatively, the pumped sediment laden water can be directed to simply another location outside of the pond and the water can evaporate from another reservoir. Still other embodiments of the invention involve directing water through various filtration treatments such that water can be at least partially filtered such that it can be returned to the pond from whence it came.

In other embodiments, more than one vacuum unit can be employed, especially if a wheeled or ski-track assembly is used to provide support for such a larger unit or units. In such embodiments, two, three or more vacuum units can be assembled such that broader swaths of a pond bottom can be covered in successive passes by an operator. In one such embodiment, a two wheeled carriage is provided and two separate vacuum units (as described herein) are mounted thereon, preferably with controls provided that allow the operator to adjust each one for suction power, aperture opening sizes, speed of travel, etc. In certain embodiments, the vacuum units are connected in series to provide extra power, to provide for separation of different type or sixed debris, etc.

In a particular embodiment, a single ski or wheel is used to contact the pond bottom surface, thus providing a degree of maneuverability that no prior art device possesses, while permitting the operator to raise the suction level above the pond surface a predetermined degree. This allows, for example, one to vacuum the pond bottom without hitting submerged underwater plant containers as the length of the ski or wheeled extension member (connected to the device itself) can be adjusted accordingly.

The suction nozzle at the front of the unit is connected to the submersible pump having a capacity sufficient to remove a layer of sand and sludge up to at least about 1 inch thick. The suctioned material can be conveyed to a separate place outside the pond where removed sand may be cleaned and if desired, later redeposited in the pond, while the water-suspended sludge is discharged through a hose.

A wheeled, castored, or ski-slatted frame can be associated with a vacuum unit, with one end of the unit having a chamber that includes an aperture formed therein for receiving in use sediment and water proximate the bottom of the pond as the apparatus moves along the bottom the pond. A gate means can be employed to control the size of the aperture formed in the chamber thereby regulating the volume of water and sediment entering the chamber and to regulate the ratio of sediment to water entering the chamber. A motorized mechanism, preferably electrically powered, can be used to move the apparatus along the bottom of the pond. Any number of devices can also be employed, if desired, to loosen sediment by scraping, plowing, etc. the bottom sediment proximate the aperture upon movement of the frame. A vent means can be used to vent the chamber to permit in use a flow into the chamber of sediment and water proximate the aperture.

One aspect of certain embodiments of the present invention include a bagging mechanism that permits an operator to remove larger debris from the pond without having such material suctioned completely through an extended hose that runs outside the pond. Instead, in one embodiment, the bagging mechanism is submersed in the pond and the bagging activity occurs at least partially underwater. In such a manner, the difficulties in handling leaves and larger debris, including the wear and tear on impeller mechanisms of vacuuming and suctioning units, is reduced. In a particular embodiment, a diaper genie-type device is employed at about the suction end closest to the pond bottom, used in association with special bagging material that is porous enough to permit large debris to be captured inside, while permitting a desirable amount of water and other smaller debris to pass therethrough. As shown in the Figures, the suction end can be designed to include a sealing mechanism for accumulated debris that is suctioned from the pond. Such sealing mechanism can include a storage container having a body and a storage film cartridge adapted to be positioned in said body. The cartridge has a continuous length of storage film therein. A sealing mechanism comprises an actuator operably connected to the cartridge such that actuation of the actuator rotates the cartridge in only one direction causing said storage film to seal. A clutch is operably connected to the actuator and the cartridge, thus allowing the cartridge to rotate in only one direction. A rack gear is operably connected to the actuator and the clutch, and a spring is connected to the rack gear. Actuation of the actuator causes the rack gear to move in a first direction against the bias of said spring and release of the actuator causes the rack gear to move in a second direction under the bias of the spring to cause the clutch to rotate the cartridge.

One aspect of certain embodiments of the present invention is directed to removal of decayed matter, sludge, debris, unsightly algae, and prevents accumulation of waste materials from difficult to reach pond bottoms, corners and dead spots. In one embodiment, large organic matter is trapped in a removable container, which can later be used as fertilizer in gardens and flowerbeds.

In the diaper genie-type bagging system described herein, a film cartridge having a hole concentrically located therein, is positioned in the container body. The film cartridge has a top surface from which a storage film extends and has a twist ring secured in the concentric hole of the cartridge. The storage film extends from the film cartridge, over and then down through the twist ring, down through the hole in the film cartridge and into the container body. Leaves and other larger pond debris are suctioned through the twist ring and hole in the film cartridge, and into the storage film. As one will appreciate, while in a diaper genie a user pushes a soiled diaper down into a container body, through the twist ring, in the pond environment at issue here, the container body and twist ring are directed towards the bottom of the pond. The vacuum suction is provided such that the bag is sucked from the open end of the container body and the twist ring, away from the pond bottom and directed along the suction path created. The bag is limited in the extent to which it can be sucked into the vacuum tube end, preferably no more than about one to two feet into the vacuum tube. After a desirable amount of leaves, pond debris is accumulated in the porous storage bag while suction is applied thereto, the twist ring can be turned to twist the bag material, thus sealing off the accumulated leaves and debris suctioned in the bag. In other words, the twist ring can be manually rotated by the user's hand, which causes the film cartridge and storage film to rotate, tying off and sealing the accumulated leaves/debris in the storage film. The storage film is preferably continuously fed from the film cartridge, preferably providing the operator with the ability to create at least three, preferably at least four and more preferably at least five separate twisted segments of at least about one foot in length, prior to having to the film cartridge exhausted of film material. While in one embodiment, the device requires the user to rotate the twist ring by hand to seal the storage film, in other embodiments, such a twisting action and consequent sealing of bag segments, can be accomplished with a powered (e.g. vacuum or electrically operated) mechanism to perform the sealing operation.

Another difference between the diaper genie device and the modified device used for pond maintenance as described herein, relates to the provision of a way to take full bag segments out of the direct suction stream created by the vacuum means. Thus, in one embodiment, the twist ring has a slot therein such that once a full bag segment has been twisted and the leaves/debris contents are sealed therein, the twisted narrow portion of the bag can be slipped or fitted through the slit in the twisted ring, thereby moving the filled segment out of the direct path of suction. When a full sealed segment is thus removed from the path of suction, the suction force then exerts a vacuum force such that another segment of the porous film is sucked into the vacuum end of the device, thus permitting such new section to be filled with leaves/debris being suctioned into the container body, twisted ring aperture, etc. One will appreciate that several segmented bags can thus be formed, each filed with a certain amount of larger solid debris, all without the operator having to exit the pond or cease the suctioning operation to refit bags to the end of the suctioning unit.

A pump of suitable size, but preferably one that handles at least about 4000 gph, more preferably at least about 5000 gph, and most preferably up to an beyond 10,000 gph is used, such pumps having an inlet port providing suction and an outlet port providing discharge. The inlet port of the pump is in fluid communication with the chamber to create in use a pressure lower in the chamber thereby forcing into the chamber the sediment and fluid proximate the aperture, often creating an inflow turbulence within the chamber to form a slurry comprising the bottom sediment and water. The outlet port of the pump is associated with a flexible hose that removes the slurry away from the pond.

A conduit can extend to the atmosphere to release air held within the chamber and/or pump. In one embodiment, the unit also includes telescoping features that move vertically relative to the frame thereby enabling an upward or downward manipulation of the pond suction end relative to the bottom of the pond.

A separate aspect of the present invention is directed to pond filtering systems that can be used with or independently with various embodiments of the pond suctioning devices, methods and systems as set forth herein. For example, as illustrated in FIGS. 4-6, skimmer devices having an encasement 40 with inflow 42, outflow ports 44, pump output portals 46, a plurality of filters 48 arranged in a vertical side-by-side fashion; a filter net 50 adjacent to the inflow port 42 and molded supports 52 surrounding the exterior portion of the encasement 40, are particularly novel as compared to existing prior art skimmer systems. Other figures disclose embodiments depicting a hinged lid device 54; a sludge trap 56 in the bottom most portion of the interior of the encasement; sludge discharge ports 58, preferably at least two and positioned toward the relative center of the interior of the encasement and between vertically inclined filter pads 48; and a submerged pump unit 60 with a threaded pump output 62 positioned within the interior of the encasement 40.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

In this respect, before explaining at least one embodiment of the device and method herein in detail it is to be understood that the invention is not limited in its application to the details of construction and to the arrangement, of the components set forth in the following description or illustrated in the drawings. The invention is capable of other embodiments and of being practiced and carried out in various ways which will become obvious to those skilled in the art who read this specification. Also, it is to be understood that the phraseology and terminology employed herein are for the purpose of description and should not be regarded as limiting of the invention in any fashion. As such, those skilled in the art will appreciate that the conception upon which this disclosure is based may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

DETAILED DISCUSSION

Figure 1:
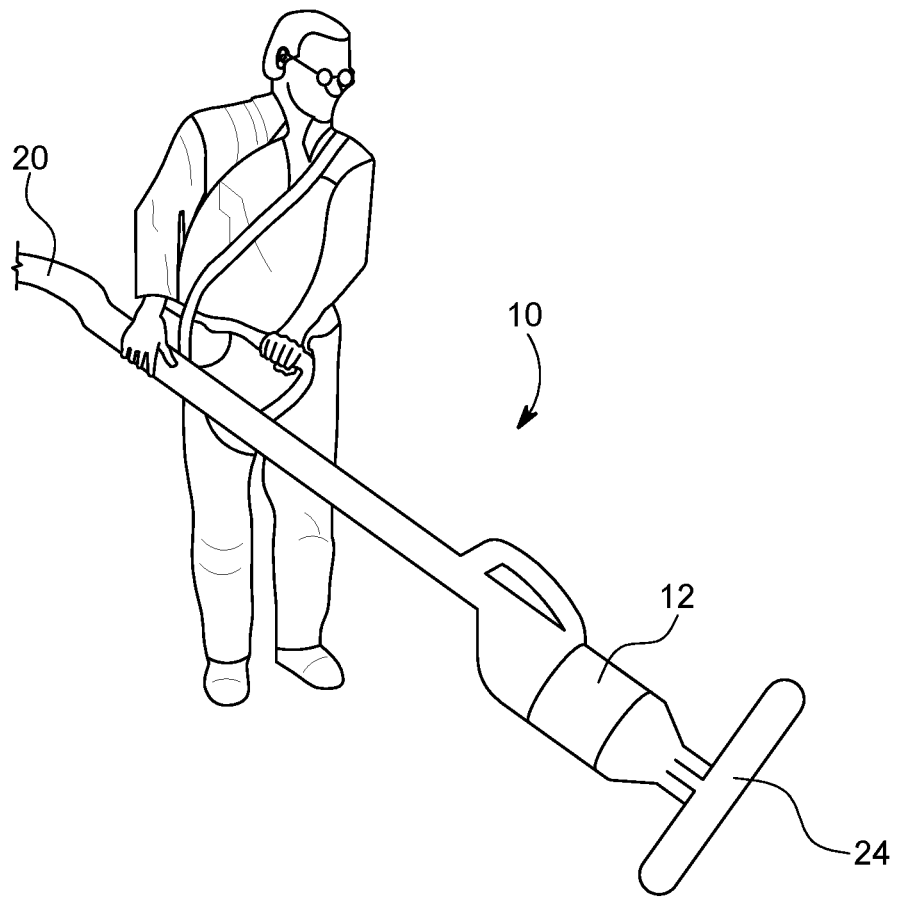
FIG. 1 is a view of one embodiment of the invention where a user manually manipulates a unit with a suctioning pump located along the same longitudinal axis as an export tube, such tube being rigid and connected to a flexible extension that exists the pond.
Figure 2:
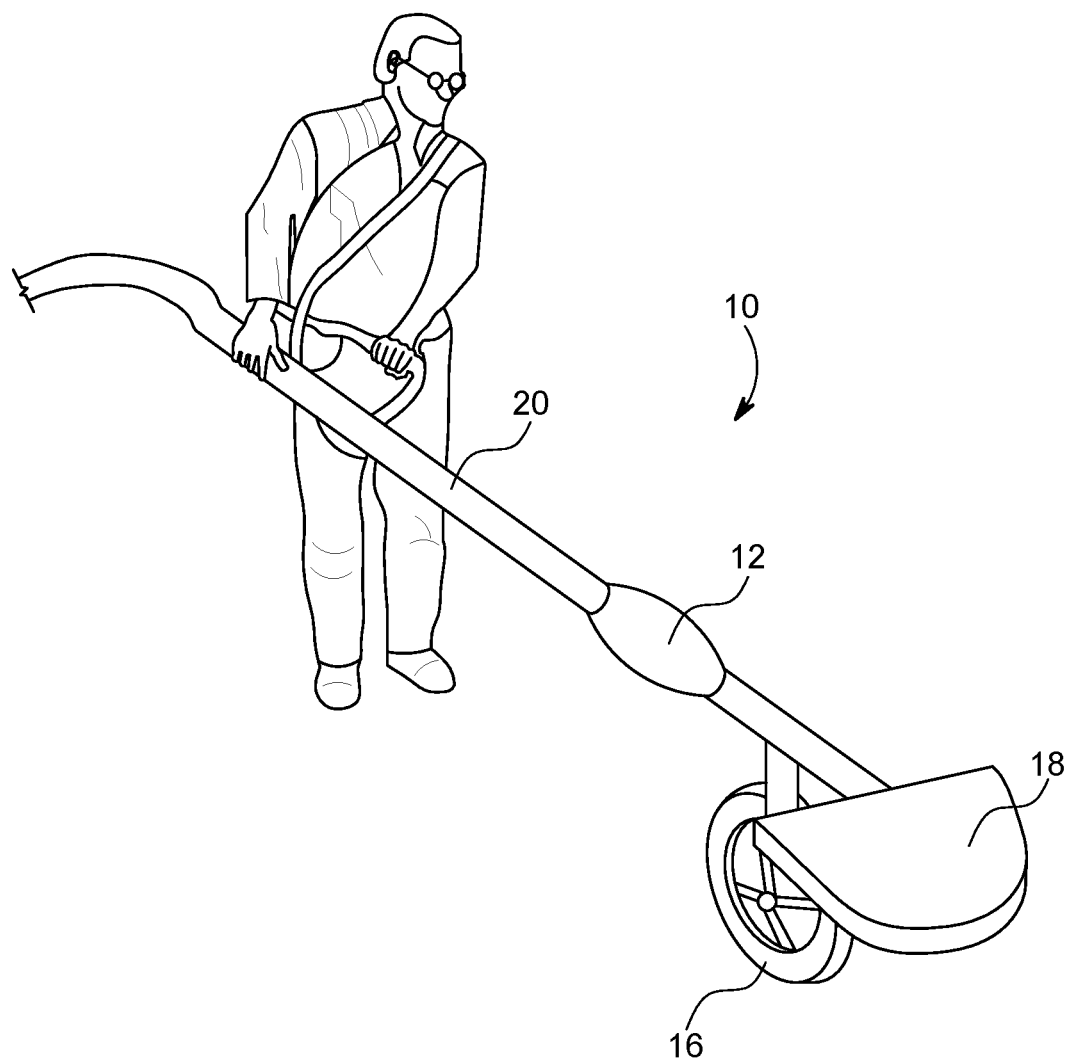
FIG. 2 illustrates an embodiment where a wheeled conveyance that contact the pond bottom is employed with a silt containing cover associated with the suctioning end of the unit.
Figure 3:
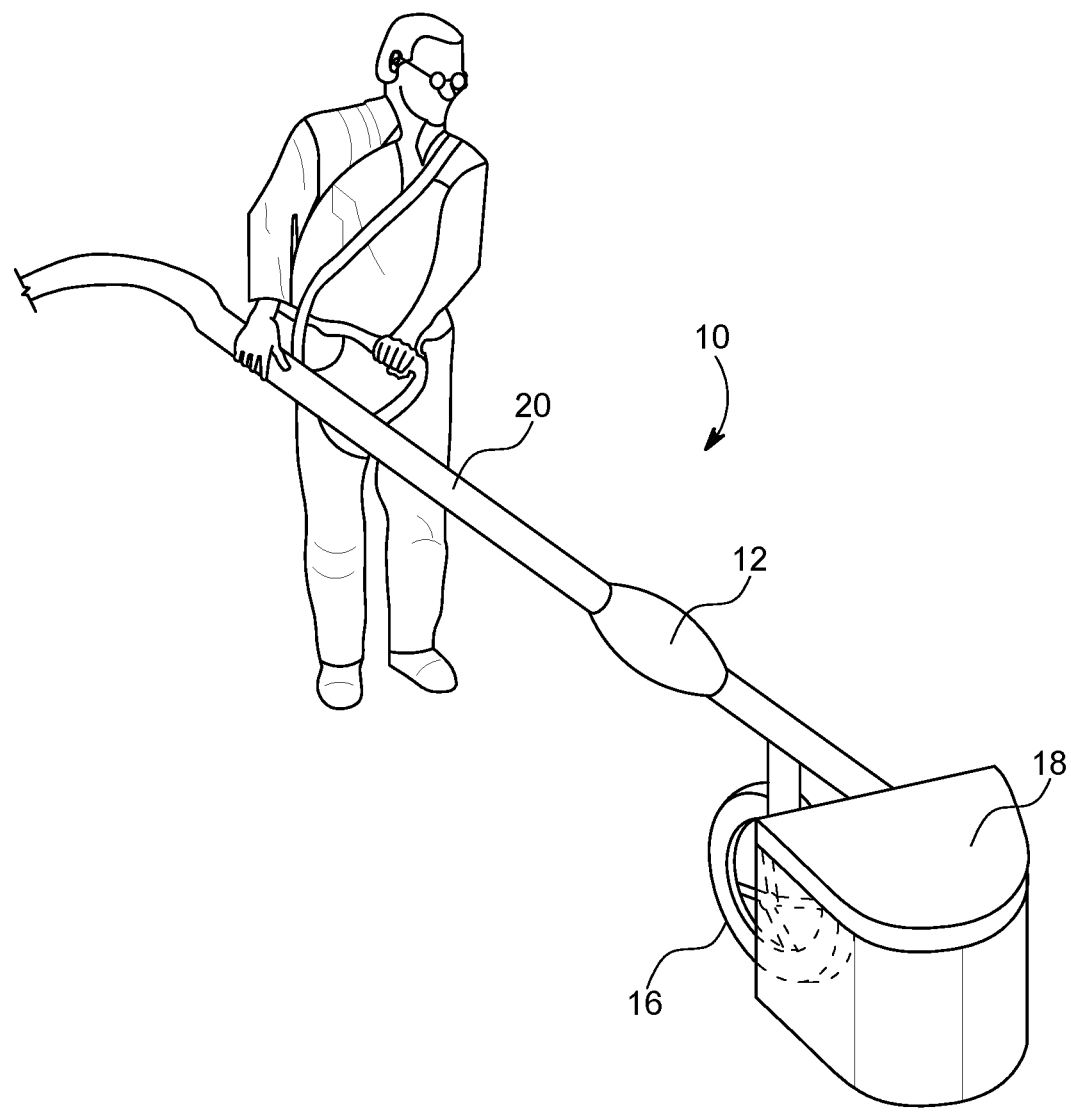
FIG. 3 illustrates one embodiment employing a vertically descending silt curtain associated with the suctioning end of a wheeled submergible vacuum unit.
Figure 4:
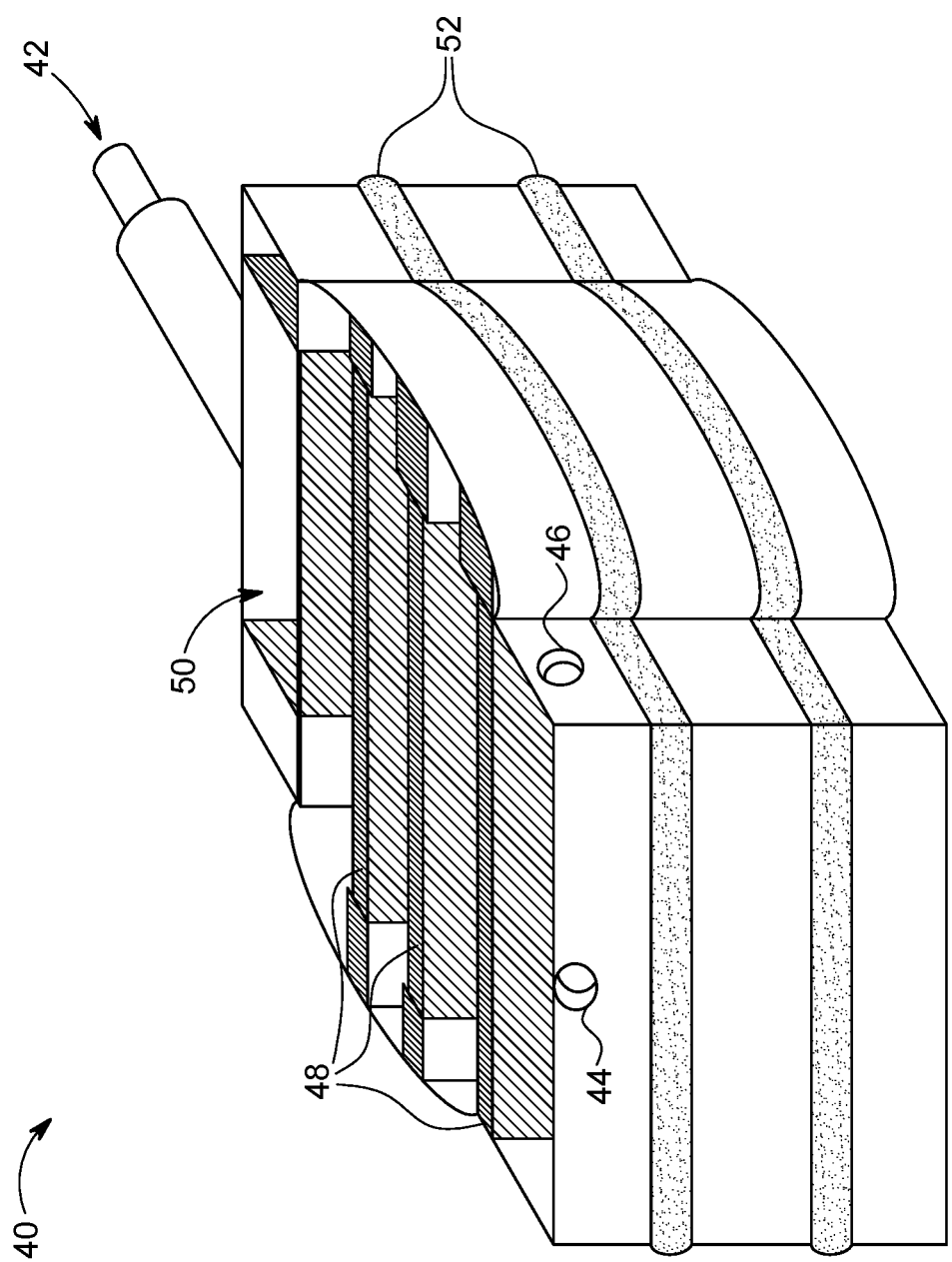
FIG. 4 illustrates a skimmer unit having a plurality of filters, molded supports and a filter net associated with an inflow port.
Figure 5:
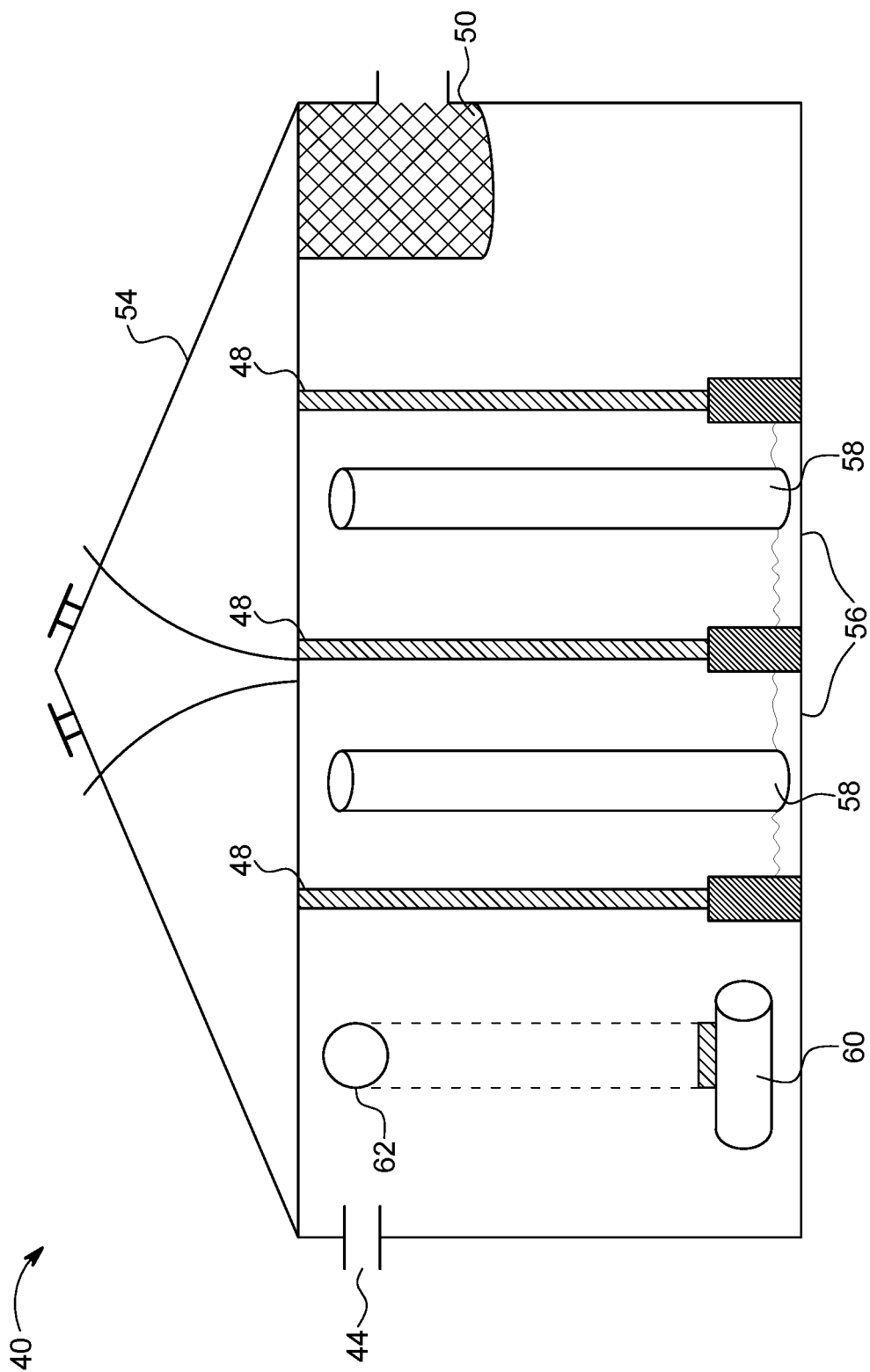
FIG. 5 shows a hinged lid embodiment of the skimmer as depicted in FIG. 4.
Figure 6:
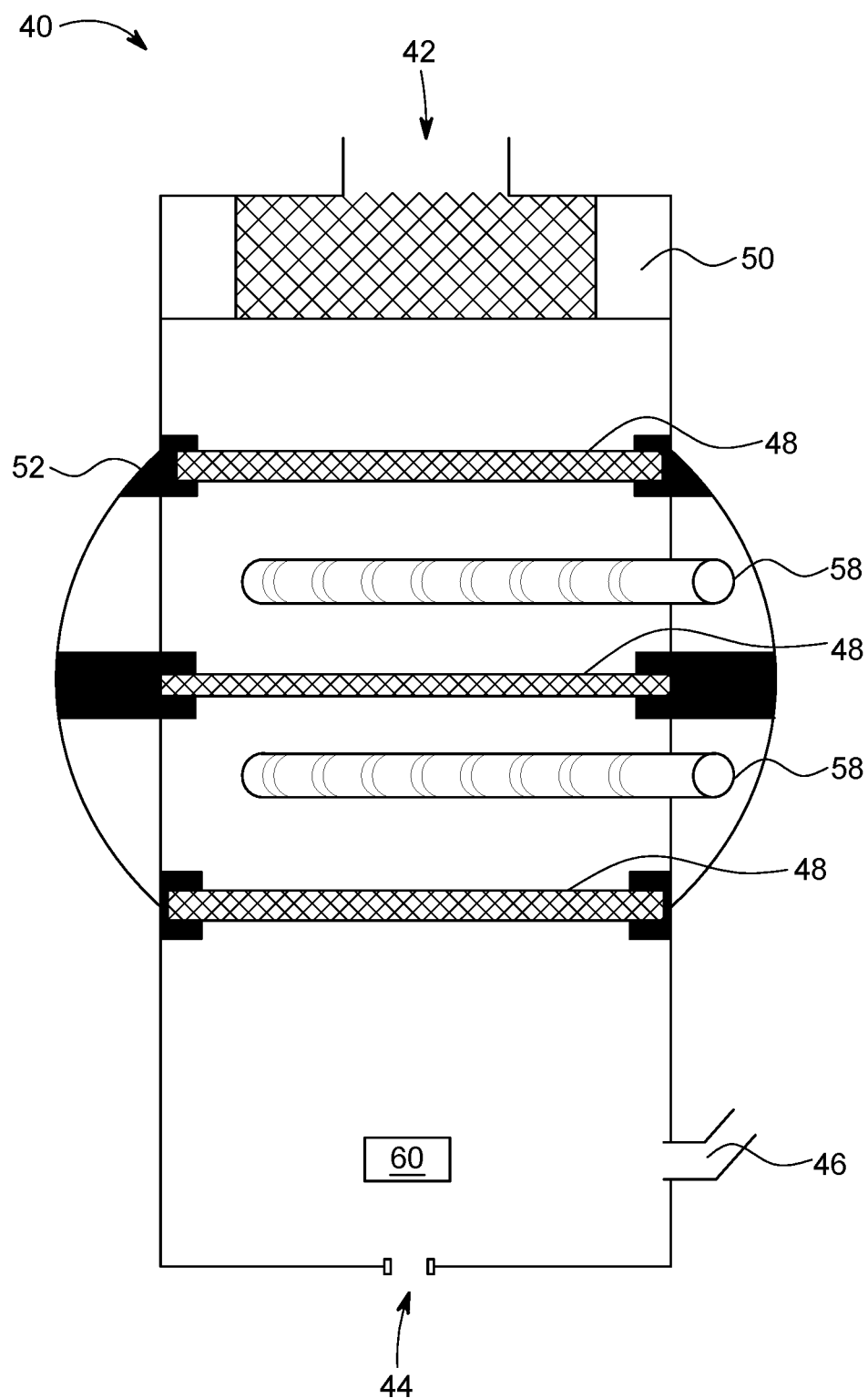
FIG. 6 shows an alternative embodiment of a skimmer unit with two sludge discharge ports in between filer pads.

FIG. 1 illustrates the apparatus of the invention 10 in a working environment for removing a layer of sediment which has settled on the bottom of a pond. The apparatus comprises a frame with a first end 24 and a second end 20. A chamber 12 with a first end 24 and a second end 20 is positioned proximate the first end 24 of the frame. The 12 chamber provides a conduit for conveying slurry to the input port of a pump and adjustment of the size of apertures can be made to adjust the ratio of sediment to water removed from the bottom of the pond.

Preferably, a single wheel 16 supports the vacuum unit and such unit is electrically powered via a long cord. The vacuum unit may include an inlet port and an outlet port. Preferably, the input port is in fluid communication with a chamber 12. A flexible conduit is in fluid communication with the second end 20 of the chamber 12 and with open conduit which extends above the level of pond.

Various patents and patent publications are hereby incorporated by reference to provide written description and support and for enablement purposes with respect to the varied and numerous embodiments of the present invention as encompassed by the scope of claims herein. These include U.S. Pat. No. 4,957,622 to Mims; U.S. Pat. No. 6,432,303 to Chesner; U.S. Pat. Nos. 7,370,445, 5,864,919 to Pineda; U.S. Pat. No. 5,317,776 to DeMoura; U.S. Pat. No. 7,314,571 to Lovestead et al; U.S. Pat. No. 7,234,657 to Doering et al; U.S. Pat. No. 4,454,993 to Shibata et al; 20080313827 to Paxton; 20050247613 to Bishop; U.S. Pat. No. 7,520,015 to Ajello; U.S. Pat. No. 7,552,551 to Kohutko; 20080109972 to Mah; U.S. Pat. No. 7,676,966 to Taplin; U.S. Pat. No. 6,383,383 to Novak; U.S. Pat. No. 4,642,919 to Werner et al.; U.S. Pat. No. 7,181,871 to Sower; and U.S. Pat. No. 6,953,321 to Roudnev et al.; and U.S. Pat. Nos. 7,686,951; 7,814,926 to Hoffmeirer et al; U.S. Pat. No. 7,806,347 to Hanke et al.; U.S. Pat. No. 7,805,793 to Paxton; 20040111825 to Kaufman et al.; 20030221412 to Harrington; 20070190591 to Grech; 20100096324 to Roberts; U.S. Pat. No. 7,686,951 to Wagner, et al.; U.S. Pat. No. 7,270,746 to Wang; U.S. Pat. No. 7,708,149 to Pank et al.; U.S. Pat. No. 5,095,571 to Sargent; U.S. Pat. No. 7,465,129 to Singleton; U.S. Pat. No. 7,686,951 to Wagner et al.; U.S. Pat. No. 7,814,926 to Hoffmeier, et al. and United States Patent Application Nos. 0070065316; 0070183905; 0070199595; 0070286752; 0080054088; 0080044293; 0080056911; 0080105311; and 0080217229.

According to another aspect of the present invention, a sediment removal system for removing sediment from a body of water comprises a suction conduit having an inlet portion defining an inlet opening, at least one retention container adapted to retain sediment removed from a body of water, and a suction pump adapted to draw sediment and water through the suction conduit and into the at least one retention container.

In a preferred embodiment, the material that has settled to the bottom of the pond is not to be unduly disturbed before being suctioned, thus allowing more of the sediment to be removed and preventing further contamination of the pond water. Thus, the method of the present invention is particularly directed and focused to achieving in a controlled manner removal of debris from a pond bottom without generating unwanted turbidity.

In still other embodiments, a mulcher-type of mechanism, similar to those employed in leaf blower systems, can be associated with the suction import end of the unit so that leaves and other debris that can be reduced in size (to a size that does not interfere with the impeller movement of the vacuum or pump employed). This provides a way to largely dispense with the herein described bagger mechanisms for large debris and leaves. In some embodiments, a combination of such systems can be provided on a unit so that the operator has options in what mechanisms can be employed for particular uses. Such mechanisms typically include vanes which provide serrations or debris-engaging structure for further mulching debris. Incorporated herein are the following patents for this particular aspect of the present invention: U.S. Pat. No. 6,629,818 to Svoboda; U.S. Pat. No. 5,791,568 to Keim and U.S. Pat. No. 5,794,864 to Hammett, et al.

Thus, in certain embodiments, a cutter pump is employed to address mulching of debris so that impeller devices are not adversely affected by debris clogging the vacuum operation. Various types of pulverizing means for receiving said solids and for reducing the solids to particulate sizes can be employed. For example, water enters a chamber from an inlet 24, an aperture control the water flow as it leaves the chamber and enters a passageway, with such passageway controlling the water flow. Separated heavier solid waste settles into a sump and pre-filtered lighter suspended solid waste is carried by the water flow to be filtered by a filter member. A cutter pump subassembly can be employed that is adapted for cutting and pumping a liquid containing entrained solids, such as slurry. Pumps of this kind are used to transport fiber suspensions and various sludges such as sewage, paper, cloth products, and plastics. Preferably, head capacity, i.e., pressure differential from suction to discharge, is maintained at desirable levels so that the chopping action does not unduly restrict the flow of the water.

Preferably, the cutting action is carried out in line with the natural flow of the water passing through the pump. Other embodiments, however can employ other pump system, such as that disclosed in U.S. Pat. No. 4,145,008, issued to Wolferd and incorporated herein by this reference, where a pump is shown in which the chopping action of the pump is provided by a blade spinning perpendicularly to the direction of fluid flow.

Another aspect of the present invention in particular embodiments is directed to a carriage for facilitating the conveyance of a suctioning unit across the bottom of a pod. Thus, provision of a wheeled or slatted carriage that can retro-fit existing suction devices, including those of the prior art as referenced herein, enables one to better accomplish the removal of silt and debris from the bottom of a pond. For example, in one embodiment a sled is attached to the bottom side of a silt enclosure or housing 18 and comprises the combination of both surface conveyance devices, such as wheels, castors, slats or skis 22, etc. in combination with either a vacuum unit or a suction port through which pond bottom debris can be suctioned off the bottom of the pond. Preferably such a carriage is employed with a submersible pump apparatus positioned at the bottom of a body of water, whether such device is remotely controlled (and thus does not necessitate a person actually entering the pond to use the device—or wherein an individual manually conveys the device across desired sections of a pond bottom.

In other embodiments, where a water pump system is employed that uses one or more powerful water intake units that remove or draw out massive amounts of water in a very short time, the pull or suction of water by these pumps generates a high velocity water flow (vortex) near the pump intake unit. The high rate of water flow is sufficiently strong that aquatic life, such as fish, turtles, etc. cannot escape the water current generated, and are sucked into the pump system. Therefore, regrettably, during water pumping operations, water is not the only element removed, but in addition, fish and other aquatic life is also drawn out indiscriminately. Accordingly, preferred embodiments of the present invention uses a protective screen to preclude aquatic life from being ingested into the pump stream. When the pumping rate of the water is increased, then the size of the screen is commensurately increased and thus, a large volume of water may flow over a larger surface area, neutralizing, maintaining, or in fact, reducing the actual approach velocity of the water near the protective screen, despite an increase in the rate of water pumped.

One will appreciate that while the present invention can be immersed and placed at the bottom floor of the body of water, it can also be floated by a buoyant or a floatation device. In one embodiment, a downward-facing intake is suspended at an elevation above the bottom of the pond, the suspension adapted to be shortened or lengthened to adjust the height above the bottom of the pond. In other embodiments, the buoyancy of the device may be changed to adjust the height above the bottom of the pond.

In various embodiments, a portable frame comprising a screen is employed to wrap around the portable frame, thus providing a low profile of the portable frame to permit drafting in shallow water situations, and decreases the overall weight of the device. Several of the figures depict various different embodiments of a suction unit being enclosed or housed within screened environments, thus facilitating the suctioning of silt and small debris without risking suctioning aquatic life and larger debris. Efficient removal of small particles is a critical component of any filtering system when filtering cloudy water.

In another aspect of the invention, a method is provided suctioning debris from the bottom of a pond that comprising the acts of: submerging a suction system having a screen of a predetermined size that precludes aquatic life of more than about 1 inch in size from passing therethrough; elevating the intake above the pond bottom to a predetermined degree; connecting the outlet to second pump located outside the pond; and powering on the pump to draw water upward through the system, thus achieving desired removal of silt laden water without substantial loss of aquatic life. In one embodiment, a submerged wheeled system is adjustable for height above the pond bottom, with such system connected to hoses or tubes and functionality connected to a separate power supply. The conveyance system preferably employs removable ski, wheels, etc. to customize the conveyance device, and may further include telescoping, locking, and adjustable height of wheels, skis, to position the suctioning action a desired distance above the bottom of the pond. Such conveyance system facilitates one to be able to avoid unseen obstacles on the pond bottom, such as rocks, aerators, potted plants, underwater structures, etc.

As described herein a housing is particularly desired to entrap silt from going into surrounding waters. Thus, a housing employing a type of a silt curtain designed to control the settling of solids (silt) provides a controlled area of containment. Reduction of turbidity and confining it to a specified area around the suction device has not been employed by prior art pond suctioning systems. The use of such a silt containing housing during suctioning operations provides for improved settling for suspended solids. Incorporated herein in their entireties by this reference are: U.S. Pat. No. 6,953,528; and U.S. Publication No. 20050016930 to Nesfield.

In certain embodiments, the present invention employs various known aspects of dredger designs to accomplish the particular purposes as set forth herein. For example, a Cutter Suction Dredger, Grab Dredger, Dustpan Dredger and trailing suction hopper dredgers can be variously employed.

In one embodiment, the above described suctioning device (especially those that employ two or more pumping units) is used in conjunction with an elongate enclosure having mesh sides and defining a closed interior for the collection of water and a mesh exterior for preventing undesired sized particulate penetration into the closed interior. Preferably a perforated plate arrayed over a cylindrical body is used where a housing comprising a screen for removing debris from water as water is suctioned from the bottom surface of a pond, a suction chamber positioned within the housing and a discharge opening for discharging water out of the suction chamber to feed a suction pipe of a pumping unit. A control zone containing liquid and suspended particles dispersed during removal of bottom sediment surface is provided via a housing that surrounds a desired suctioning area, preferably at least about 1 square foot around the suctioning action, more preferably about 2 square feet, and more preferably about 3 square feet around the suctioning action. Transparent panels are preferably employed to form such housing so as to facilitate some visual assistance of an operator of the suctioning unit. Such silt constraining housing may also have one or more sections within the outer confines of the housing to further reduce turbidity and to direct silt laden water to the suctioning unit port. Thus, barrier walls comprised of individual movable sheets capable of contouring to the bottom of the surface of the waterway can be used in containing liquid and suspended particles dispersed during suctioning operations. These features are designed to reduce sediment dispersion resulting from cutterblade, jetting, or raking mechanisms that may also be used in concert with the suctioning units of the present invention. Various curtains (flexible, impermeable canvas or rubber-like sheets) assist in isolating the area of suctioning.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing a layer of sediment which has settled on the bottom of a large water body, comprising: a structural frame configured to contain a bottom water flow and avoid a re-suspension of sediment outside the vicinity of the structural frame, wherein the structural frame comprises a control zone configured for containing liquid and suspended particles dispersed during removal of bottom sediment in a suctioning area that is at least about 3 square feet, said structural frame having at least 4 wheels configured to provide support for a suction height, said at least 4 wheels associated with the structural frame to facilitate conveyance when the structural frame is submerged in the large water body; at least one sediment removing vacuum unit operably associated with the structural frame; at least one segment of PVC or plastic pipe being at least 1 inch in diameter, said at least one segment being connected to the vacuum unit; at least one suction line configured to conduct a suctioned bottom water flow; and a filter being permeable to water and having a predetermined size to trap debris; wherein said structural frame has one or more sections that direct silt laden water to the vacuum unit; and wherein the vacuum unit is adapted to connect to a hose being of at least about 8 feet in length and having a diameter of at least about 2 inches, and said suctioned bottom flow is directed through the filter and wherein the control zone comprises a silt containing enclosure around the suctioning area that is at least about 3 square feet.

2. The apparatus of claim 1, further comprising a mowing mechanism having sharpened surfaces to sever vegetation growing on the bottom of the large water body.

3. The apparatus of claim 1, further comprising a rake having a plurality of prongs extending into a sediment layer of said large water body for loosening the sediment layer upon movement of said apparatus.

4. The apparatus of claim 1, further comprising a sediment containing feature associated with a storage container.

5. The apparatus of claim 1, further comprising a fitting associated with the vacuum unit that precludes undesired sizes of debris from passing through when said vacuum unit draws sediment and water.

6. The apparatus of claim 1, further including a telescoping unit to move the vacuum unit vertically relative to the bottom of the large water body.

7. The apparatus of claim 1, further comprising a first articulating means for enabling said vacuum unit to move vertically relative to the bottom of the large water body.

8. The apparatus of claim 4, wherein the storage container receives accumulated debris suctioned from the large water body.

9. The apparatus of claim 1, wherein the plurality of wheels support a silt constraining enclosure.

10. The apparatus of claim 1, further comprising barrier walls comprised of movable sheets that surround a vacuum area and are capable of contouring to the bottom of the large water body.

11. The apparatus of claim 1, further comprising a curtain that is flexible, that surrounds a vacuum area and that assists in isolating an area of suctioning.

12. The apparatus of claim 1, wherein filtered water flow is returned into the large water body.

* * * * *